United States Patent [19]

Takahashi et al.

[11] Patent Number: 5,321,564

[45] Date of Patent: Jun. 14, 1994

[54] DATA HEAD OFFSET DETECTING CIRCUIT IN MAGNETIC DISK UNIT AND MAGNETIC DISK UNIT USING SAID DATA HEAD OFFSET DETECTING CIRCUIT

[75] Inventors: Eisaku Takahashi, Higashine; Taturo Sasamoto; Chiharu Ohba, both of Kawasaki, all of Japan

[73] Assignee: Fujitsu Limited, Japan

[21] Appl. No.: 875,989

[22] Filed: Apr. 28, 1992

[30] Foreign Application Priority Data

Apr. 30, 1991 [JP] Japan .................................. 3-098508

[51] Int. Cl.[5] .............................................. G11B 5/546
[52] U.S. Cl. ................................ 360/77.04; 360/77.05; 360/77.08
[58] Field of Search ............... 360/77.04, 77.05, 77.07, 360/77.08

[56] References Cited

U.S. PATENT DOCUMENTS

| 5,023,733 | 6/1991 | Koga et al. | 360/77.04 |
| 5,109,502 | 4/1992 | Sasamoto et al. | 360/77.04 |
| 5,208,711 | 5/1993 | Kitamura et al. | 360/77.05 |

FOREIGN PATENT DOCUMENTS

| 0267771 | 5/1988 | European Pat. Off. |  |
| 0285452 | 10/1988 | European Pat. Off. |  |
| 0134366 | 10/1981 | Japan | 360/77.05 |
| 273284 | 11/1988 | Japan . |  |
| 1092971 | 4/1989 | Japan . |  |
| 1264674 | 10/1989 | Japan . |  |

Primary Examiner—Edward K. Look
Assistant Examiner—Christopher Verdier
Attorney, Agent, or Firm—Greer, Burns & Crain, Ltd.

[57] ABSTRACT

A data head offset detecting circuit in a magnetic disk unit includes a first offset detector that detects an offset $\beta$ based on servo information on a data surface read by the data head, a second offset detector that detects an offset $\gamma$ based on servo information on the servo surface read by the servo head, and an offset calculator for calculating a real offset $\alpha$ resulting from the subtracting of the offset $\gamma$ from the offset $\beta$. By using the above circuit, an offset for a correction of an offtrack is detected accurately even when the heads are vibrating.

8 Claims, 19 Drawing Sheets

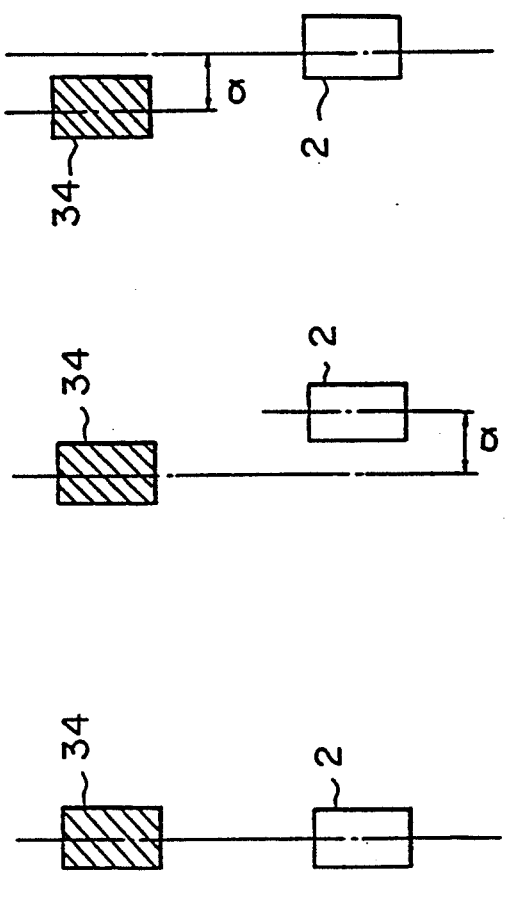

Fig. 20

```
RAM HEAD ADDRESS = 1000
HEAD            = 2
SECTOR          = 11

RAM ADR  =(SECTOR/4)+(HEAD×8)+RAM HEAD ADDRESS
         =( 11 /4)+ 16 + 1000
         =1018

OFFTRACK =((RAM[RAM ADR+1]) - RAM[RAM ADR])
          *( MOD (SECTOR,4) -1.5) + RAM[RAM ADR]
         =((9 - 15 )/4) *( MOD (11,4) -1.5) + 15
         = -1 *( 3 -1.5) + 15
         = 13.5
```

DATA HEAD OFFSET DETECTING CIRCUIT IN MAGNETIC DISK UNIT AND MAGNETIC DISK UNIT USING SAID DATA HEAD OFFSET DETECTING CIRCUIT

BACKGROUND OF THE INVENTION

1. Field of the Invention

The present invention relates to a data head offset detecting circuit for use in a magnetic disk unit and a magnetic disk unit using the data head offset detecting circuit, which uses servo information on servo and data surfaces to correct an offset of data heads in the magnetic disk unit.

In recent years as the magnetic disk unit has had an increasingly larger capacity, narrower track gaps have been utilized in magnetic disk units.

When the conventional head positioning control using the servo information on the servo surface alone is used with a magnetic disk having a higher track density with such narrower track gaps, the data head, which moves over the data surface and is controlled to be ontrack based on the servo information on the servo surface is likely to be offtrack and cannot read the data on the data surface if the operating ambient of the magnetic disk unit, especially, the ambient temperature, changes from low to high or vice versa.

A head positioning circuit for offset correction was proposed that corrects an offset by recording servo information on the data surface as well and using the servo information on both the servo and data surfaces to prevent the data head from being offset. This invention relates to the above circuit.

2. Description of the Related Art

For this offset correction, a head positioning control is done by effecting an offset detection at every predetermined time interval depending upon the change of ambient temperature, storing the offset thus detected into a memory for each head, and reading a corresponding offset at the time of data write or read to correct the offset.

On the assumption that the servo head is accurately controlled to be on track based on the servo information on the servo surface, this offset detection is done to read the servo information on the data surface by the data head and detect an offset of the data heads from the servo head.

During offset detection, however, the servo head under ontrack control is likely to be offtrack due to external vibration, poor accuracy of control or the like so that the offset of the data head is detected at the timing of the offtrack. No accurate correction of the data head offset can be done.

A magnetic disk unit may have, for example, four magnetic disks mounted on the rotating shaft of a spindle motor and thus rotated at a predetermined speed.

Of the four magnetic disks, the upper three have a data surface formed on either side, front and rear, thereof and the lower one has a data surface formed on the front side thereof and a servo surface on the rear side thereof.

Data heads are provided opposite the data surfaces of the magnetic disks and a servo head is provided opposite the servo surface.

The data heads and servo head are driven together by a voice coil motor (will be referred to as "VCM" hereafter) and move in a direction crossing the tracks on the magnetic disks.

The servo surface over which the servo head is positioned has servo information recorded in all the cylinders (cylinder: all tracks accessed by all the magnetic head when a comb is in a certain position) thereof, and a position signal indicative of the position of the servo head on the track is provided based on a signal read by the servo head.

On the other hand, the data surfaces of the data heads have recorded in the free space of a predetermined cylinder track or of all the cylinder sectors thereof servo information used to detect an offset of the data heads.

First, if the servo head and data head are in the cylinder center, no offset correction is necessary; actually, however, the data head is off the cylinder center on which the servo head is positioned due to the difference in the expansion coefficient between the metals used to form the head actuator and the like.

Under the ontrack control of the heads based on the servo information on the servo surface, the offset of the data head from the servo head is detected based on the servo information read by the data head from the data surface.

At the time of write or read, the data head can be accurately positioned in the cylinder center by displacing the heads (offset correction) to eliminate the offset.

However, the aforementioned conventional offset detecting circuit has a disadvantage in that if the data heads are oscillated due to a disturbance or poor accuracy of positioning control during detection of a data head offset, then detection of a data head offset done at the time of such oscillation will result in a measurement error.

The offset of the data head from the servo head should be detected, but the offset of the data head from the cylinder center is detected in a condition where the servo head is offset from the cylinder center because of the oscillation of the heads.

If an offset correction is done based on the offset thus detected, the data head will be offset from the cylinder center so that the offset correction will cause an offset of the data head.

The related arts regarding this invention are disclosed in Japanese Unexamined Patent Publication (Kokai) No. 62-266781.

SUMMARY OF THE INVENTION

An object of the present invention is to provide a data head offset detecting circuit for use in a magnetic disk unit and a magnetic disk unit using the data head offset detecting circuit, that can accurately detect and is usable for an offtrack correction using the servo information on the servo and data surfaces.

According to a first aspect of the invention, there is provided a data head offset detecting circuit in a magnetic disk unit including a servo surface on a disk data medium, a servo head provided opposite the servo surface, a plurality of data surfaces on disk data media that store data, and a plurality of data heads provided opposite the data surfaces, respectively for correcting an offset of the data heads using servo information on the servo surface and servo information on the data surfaces. The offset detecting circuit includes a first offset detecting means for detecting an offset value of the data heads based on the servo information read by the data heads from the data surfaces; a second offset detecting means for detecting an offset value of a servo head based on the servo information read by the servo head from the servo surface; and an offset calculating means for calculating a true offset value by subtracting the offset value detected by the second offset detecting means from the offset value detected by the first offset detecting means.

According to a second aspect of the invention, there is provided a magnetic disk unit using a data head offset detecting circuit including a servo surface on a disk data medium, a servo head provided opposite the servo surface, a plurality of data surfaces on disk data media that store data, and a plurality of data heads provided opposite the data surfaces, respectively, for correcting an offset of the data heads using servo information on the servo surface and servo information on the data surfaces. The offset detecting circuit includes a first offset detecting means for detecting an offset value of the data heads based on the servo information read by the data heads from the data surfaces; a second offset detecting means for detecting an offset value of a servo head based on the servo information read by the servo head from the servo surface; and an offset calculating means for calculating a true offset value by subtracting the offset value detected by the second offset detecting means from the offset value detected by the first offset detecting means.

Other features and advantages of the invention will be apparent from the following description with reference to the accompanying drawings.

BRIEF DESCRIPTION OF THE DRAWINGS

FIGS. 2A, 2B, and 2C are explanatory diagrams illustrating conventional offset detection and offset correction;

FIG. 20 is an explanatory diagram showing an example of a calculation of the linear interpolation of FIG. 18;

DESCRIPTION OF THE PREFERRED EMBODIMENTS

Prior to an explanation of embodiments, a related art of the invention is supplemented with reference to drawings.

Figure 1:
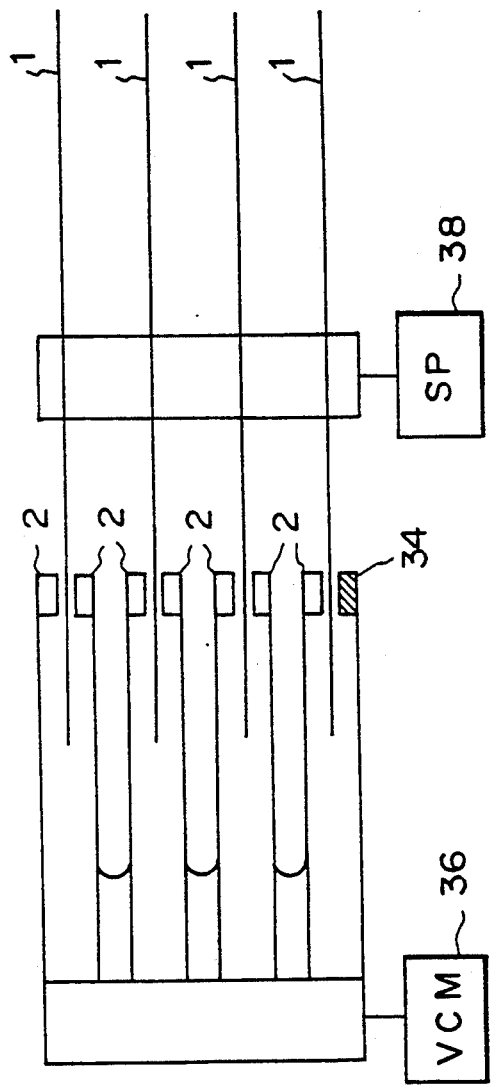
FIG. 1 is a schematic explanatory diagram of a magnetic disk unit.

FIG. 1 shows a schematic view of a magnetic disk unit, 1 denotes a magnetic disk, 2 denotes a data head, 34 denotes a servo head, 36 denotes a voice coil motor (VCM), and 38 denotes a spindle motor.

FIGS. 2A, 2B, and 2C are explanatory diagrams illustrating an offset detection of the data head 2. As shown in FIG. 2A, if the servo head 34 and the data head 2 are positioned on the cylinder center, offset correction is not necessary. Actually, however, the data head 2 may be off the cylinder center on which the servo head 34 is positioned as shown in FIG. 2B because of the difference in the expansion coefficient between the metals used to form the head actuator and the like.

Under the ontrack control of the heads based on the servo information on the servo surface, the offset $\alpha$ of the data head 2 from the servo head 34 is detected based on the servo information read by the data head 2 on the data surface.

At the time of write or read, the data head 2 can be accurately positioned in the cylinder center by displacing the heads (offset correction) to eliminate the offset $\alpha$ as shown in FIG. 2C.

Figure 3B:
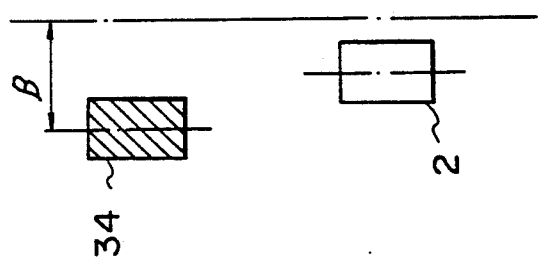
FIGS. 3A and 3B are explanatory diagrams illustrating an offset detection and an offset correction when heads vibrate.
Figure 3A:
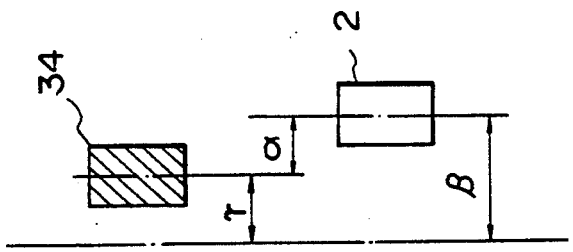

However, the aforementioned conventional offset detecting system has a disadvantage in that the data heads may oscillate because of a disturbance or poor accuracy of positioning control during detection of a data head offset, and detection of a data head offset done at the time of such oscillation will result in a measurement error as shown in FIG. 3A.

The offset $\alpha$ of the data head 2 from the servo head 34 should be detected, but the offset $\beta$ of the data head 2 from the cylinder center is detected in a condition where the servo head 34 is offset by $\gamma$ from the cylinder center because of the oscillation of the heads.

If an offset correction is done based on the offset $\beta$ thus detected, the data head 2 will be offset from the cylinder center as shown in FIG. 3B so that the offset correction will cause a further offset of the data head 2.

Figure 4:
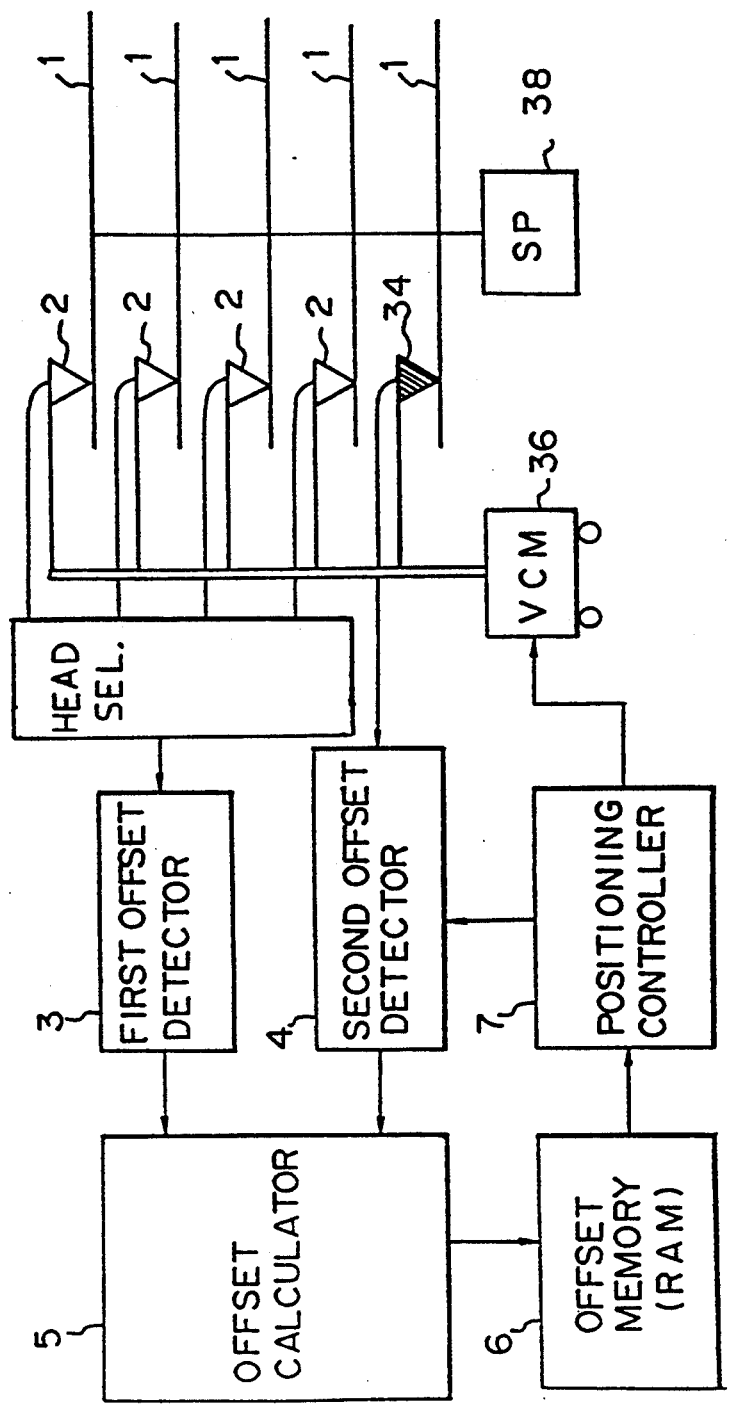
FIG. 4 is a block diagram explaining a summary of an embodiment according to the invention.

Below, a summary of embodiments of the invention is explained with reference to FIG. 4.

An embodiment of the present invention is a data head offset detecting circuit for use in a magnetic disk unit, which uses the servo information on both the servo surface and data surfaces of disk media 1 to correct the offset of data heads 2.

The above circuit is attained with a first offset detector 3 that detects an offset β of data heads 2 based on the servo information read by the data heads 2 from the data surfaces; a second offset detector 4 that detects an offset γ of a servo head 34 based on the servo information read by the servo head 34 from the servo surface; and an offset calculator for calculating a real offset α derived from subtraction of the offset γ detected by the second offset detector 4 from the offset β detected by the first offset detector 3.

According to a first working aspect of the present invention, first servo information A offset a predetermined amount outward from the ontrack position and second servo information B offset a predetermined amount inward from the ontrack position are recorded for each sector as servo information on the data surfaces.

According to a second working aspect of the present invention, the first offset detector 3 calculates a signal indicative of a difference $(V_A - V_B)$ between the first servo information A and second servo information B read by the data heads 2 from the data surfaces and multiplies the difference signal $(V_A - V_B)$ by a constant proportion coefficient K to detect the offset β.

According to a third working aspect of the present invention, there is further provided an offset memory 6 using a RAM that stores for each of the data heads 2 the offset α calculated by the offset calculator 5.

According to a fourth working aspect of the present invention, the servo information on the data surfaces are recorded for each sector. Offsets α1 to αn detected for each sector are averaged by a predetermined number of sectors (N) and stored into the RAM in the offset memory 6. Thus, the capacity of the RAM can be decreased.

According to a fifth working aspect of the present invention, there is further provided a positioning controller 7 that provides an offset correction at the time of read or write by the data heads 2 from or onto the data surfaces by reading a mean offset for a to-be-accessed sector and sectors just before and next to that sector and determining an offset for the to-be-accessed sector by linear interpolation.

Figure 5:
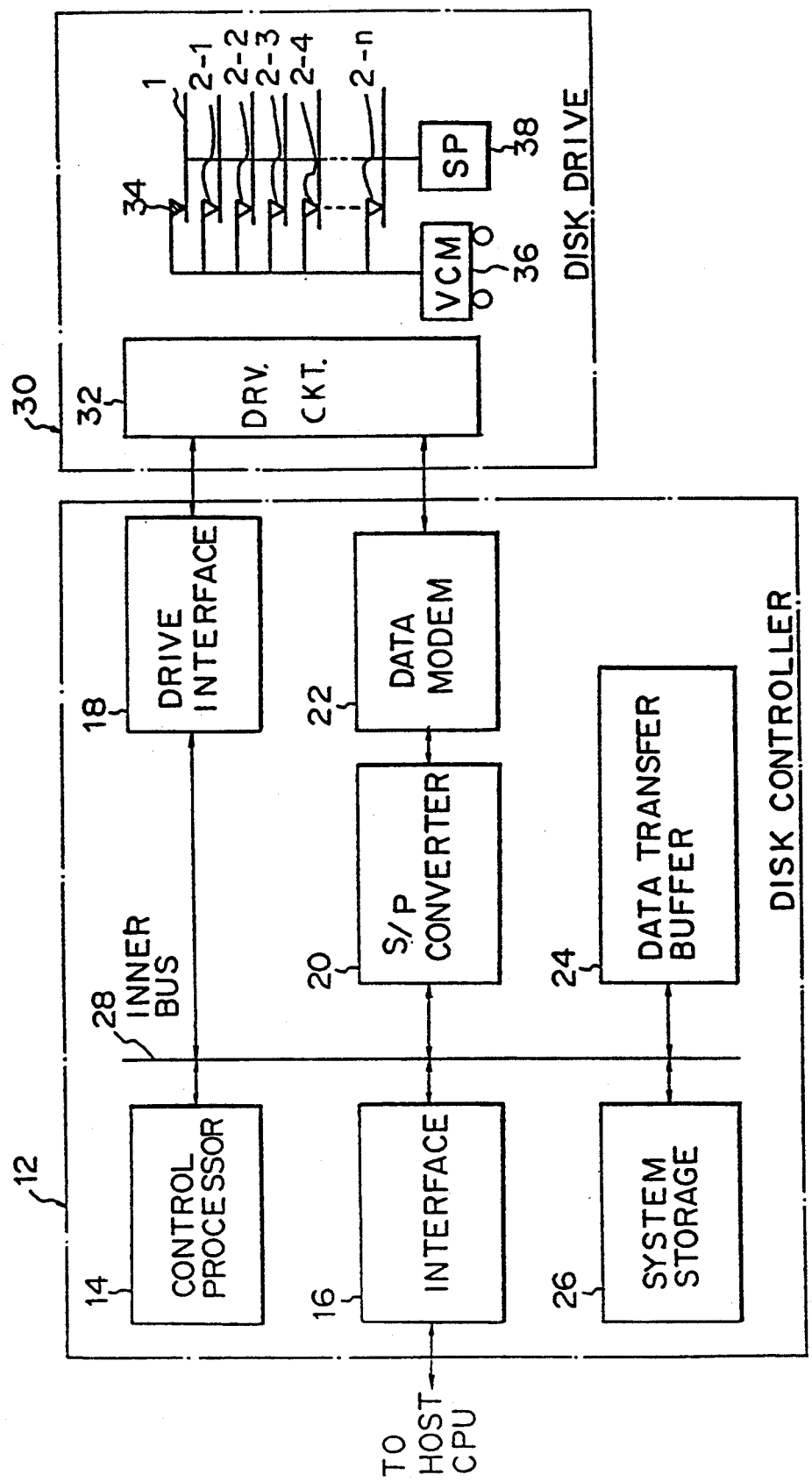
FIG. 5 is a block diagram of the embodiment according to the invention.

A block diagram of the magnetic disk unit according to the embodiment of the invention is shown in FIG. 5.

As shown, the magnetic disk unit generally consists of a disk controller 12 and disk drive 30.

The disk controller 12 includes a control processor 14 that provides a centralized control over the whole magnetic disk unit.

Connected to the control processor 14 by means of an internal bus 28 are an interface 16 for connection to the host CPU, a drive interface 18 for connection to the disk drive 30, a serial/parallel converter 20, a data transfer buffer 24 and a system storage 26.

The drive interface 18 conveys control commands from the control processor 14 to the disk drive 30.

Write or read data is transferred between the serial/parallel converter 20 and the disk drive 30 via a data modem 22.

The serial/parallel converter 20 and data modem 22 usually form together a VFO (variable frequency oscillator).

Write or read data is once stored into the data transfer buffer 24 and then transferred to the disk drive 30 or host CPU.

The disk drive 30 has provided therein a drive circuit 32 that rotates a plurality of magnetic disks 1 as memory media by means of a spindle motor (SP) 38 at a constant speed, and the magnetic disks 1 have provided in combination therewith heads that are moved by a voice coil motor (VCM) 36 in a direction crossing the tracks.

Of the plurality of heads, the highest one is a servo head 34 and the rest are data heads 2-1 to 2-n.

The magnetic disk 1 opposite the servo head 34 is a servo disk having servo information recorded in all cylinder positions (in all track positions) on the servo surface thereof.

Each of the magnetic disks 1 to or from which the data heads 2-1 to 2-n write or read data has a data surface formed thereon.

Figure 7:
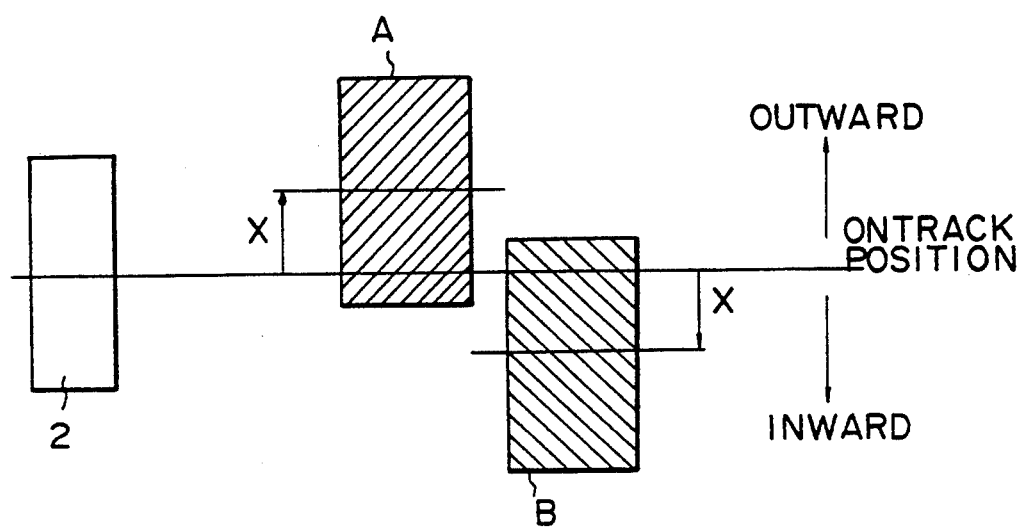
FIG. 7 is an explanatory diagram of a servo information stored on a data surface.

The data surfaces have servo information recorded per sector. More particularly, concerning an arbitrary track on the data surface of the magnetic disk, first servo information A being a predetermined frequency such as a maximum write frequency signal, is written in an area X (μm) displaced outward from the ontrack position of the data head 2 and second servo information B is similarly written in an area X (μm) displaced inward from the ontrack position, following the first servo information A, as shown in FIG. 7.

Figure 8:
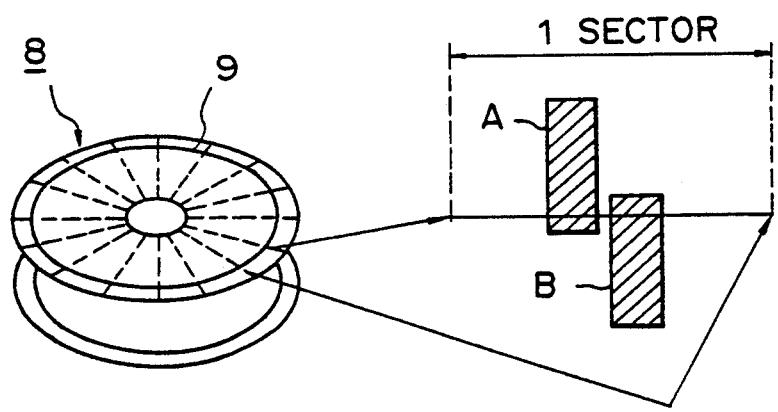
FIG. 8 is an explanatory diagram showing an example of storing the servo information on the data surface.
Figure 9:
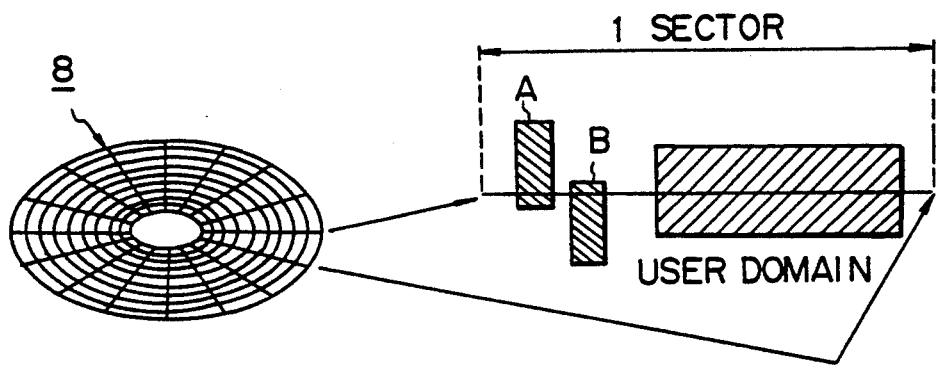
FIG. 9 is an explanatory diagram showing another example of storing the servo information on the data surface.

The method of writing the servo information onto the data surface includes a write to a predetermined track 9 on the data surface 8, as shown in FIG. 8, and a write to free spaces in all the sectors on the data surface 8, as shown in FIG. 9.

When the data head 2 is ontrack, the servo information A and B are evenly read so that read signals $V_A$ and $V_B$ from the data heads 2 will have the same value.

And when the data head 2 is outwardly offtrack, the servo information A is read in a larger amount than the servo information B so that read signal $V_A$ will be larger than the read signal $V_B$.

Further, when the data head 2 is inwardly offtrack, the servo information B is read in a larger amount than the servo information A so that read signal $V_B$ will be larger than the read signal $V_A$.

A control microprocessor provided in the disk drive 30 reads the difference $(V_A - V_B)$ between the read signals $V_A$ and $V_B$ from the data heads 2 to determine the offset magnitude.

Figure 10:
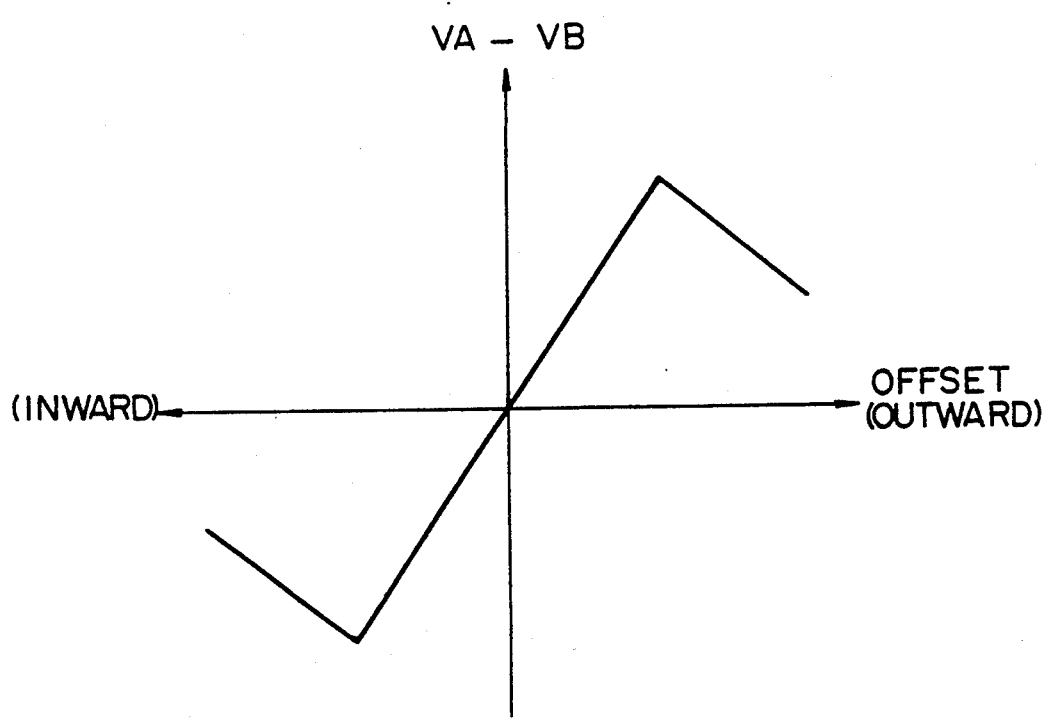
FIG. 10 is a graph showing a characteristic of a servo differential signal to an offset value.

At this time, the relation between the offset and the read difference signal $(V_A - V_B)$ shows a predetermined proportion coefficient (gradient) K as shown in FIG. 10.

Therefore, the offset β can be calculated by multiplying the read difference signal $(V_A - V_B)$ between the servo information A and B on the data surfaces by the proportion coefficient K. Namely, the offset β determined based on the servo information on the data surface is calculated as follows:

$$\beta = K \cdot (V_A - V_B)$$

Figure 6:
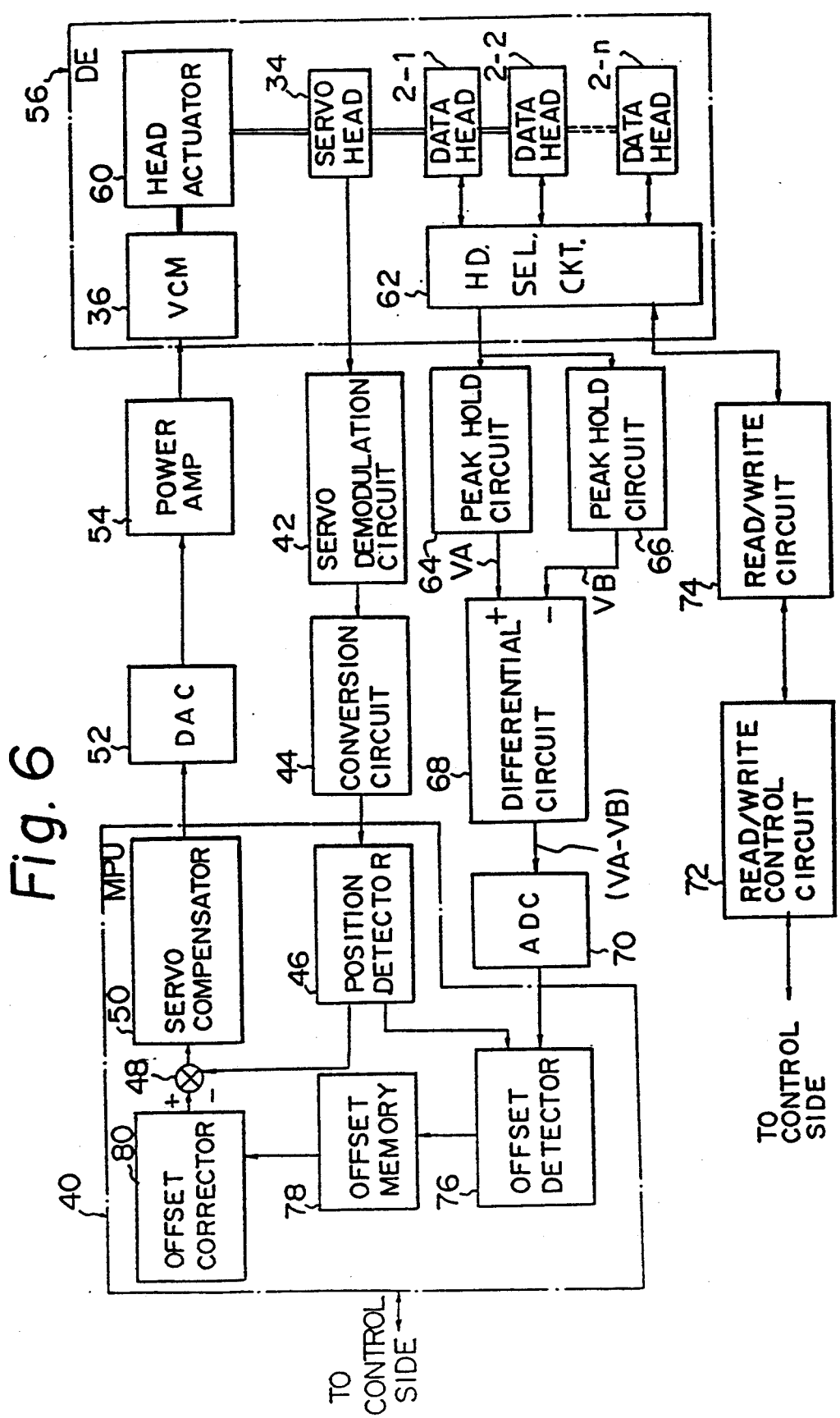
FIG. 6 is a block diagram of a disk drive unit in the embodiment of FIG. 5.

FIG. 6 is a construction diagram of one embodiment of the disk drive 30 in FIG. 5.

As shown, the disk drive 30 has a microprocessor (MPU) 40 as main controller.

The disk drive 30 also has a disk enclosure (DE) 56 provided with a head actuator 60 that is driven by VCM 36, and the servo head 34 and data heads 2-1 to 2-n are mounted on the head actuator 60.

The servo signal read by the servo head 34 is demodulated by a servo demodulation circuit 42 into two position signals POSN and POSQ, which will be supplied to a conversion circuit 44.

Figure 11:
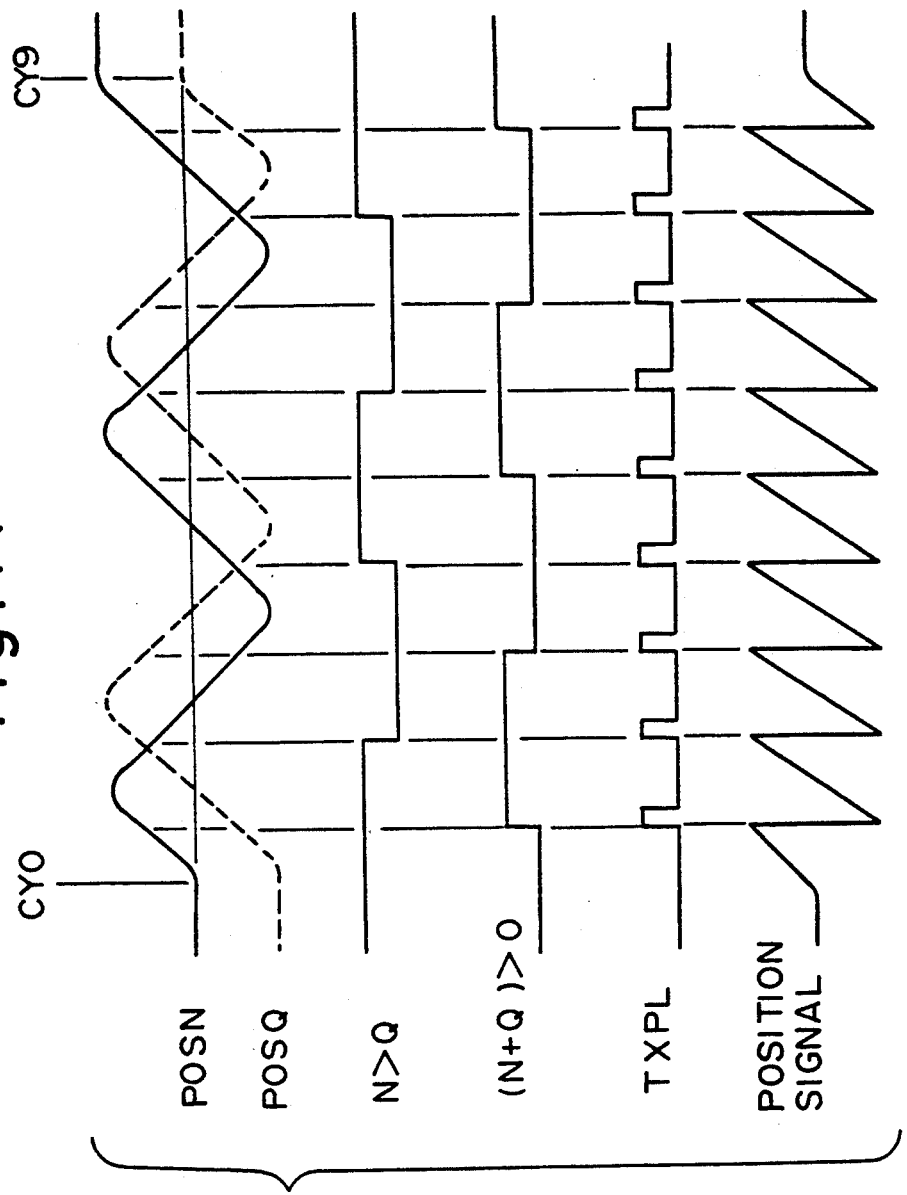
FIG. 11 is an explanatory diagram showing waveforms of a conversion circuit of FIG. 6 and position data obtained from an output signal of the conversion circuit.

As shown in FIG. 11, the conversion circuit 44 produces a (N>Q) and {(N+Q)>O} signals based on the position signals POSN and POSQ supplied from the servo demodulation circuit 42. When the edges of these two signals are detected, a track crossing pulse TXPL is produced and a counter counts how many times the head has crossed the track.

Each signal from the conversion circuit 44 is read into a position detector 46 in the microprocessor 40 to produce position data that varies linearly for each track shown in FIG. 11. Accordingly, the offset $\gamma$ of the servo head determined based on the servo information on the servo surface during offset detection is obtainable as a position signal shown in FIG. 11. In the figure, CY shows a cylinder.

Of course, it is possible to detect head speed based on the period of the track crossing pulse TXPL from the conversion circuit 44.

The microprocessor 40 incorporates a servo processor which includes the position detector 46, an add point 48 and a servo compensator 50, and the servo process is executed under control of a program. The position detector 46 provides two kinds of control, speed control and position control (ontrack control). Namely, for the head's access to an object track, the head is moved under the speed control, and upon arrival of the head at the object track, the speed control is switched to the position control under which the head is placed ontrack.

During ontrack control under which the head seeks an object track, the microprocessor 40 supplies position control data to VCM 36 via the servo compensator 50 so that the position signal delivered from the position detector 46 and shown in FIG. 11 will always be a signal indicative of the track center. The servo compensator 50 compensates the advance phase by increasing the gain of the high frequency portion of the servo signal.

The position control data from the microprocessor 40 are converted to an analog voltage by means of a DA converter 52 and this analog voltage is then amplified in power by means of a power amplifier 54 to drive VCM 36.

On the other hand, the microprocessor 40 incorporates an offset detector 76, an offset memory 78 and an offset corrector 80.

After the magnetic disk unit is energized, the offset detector 76 receives an interrupt that follows a predetermined time sequence and executes an offset detection.

The time interval of this offset detection is set short immediately after the magnetic disk unit is energized, that is, when the ambient temperature changes significantly. The time interval is set long, such as once per hour after a lapse of a certain time, that is, when the temperature has become stable.

The offset detector 76 is supplied with a difference signal $(V_A - V_B)$ that is based on a read signal from any one of the data heads 2-1 to 2-n.

Namely, the data heads 2-1 to 2-n are connected to a head selection circuit 62 which, receiving a select signal from the microprocessor 40, supplies a read signal from one of the data heads to peak hold circuits 64 and 66.

Under the timing control of the microprocessor 40, the peak hold circuit 64 holds the peak value $V_A$ of the read signal of the first servo information A recorded on the data surface.

Also under the timing control of the microprocessor 40, the peak hold circuit 66 holds the peak value $V_B$ of the read signal of the second servo information B recorded on the data surface.

There is also provided a differential circuit 68 that produces a signal $(V_A - V_B)$ indicative of the difference between the output signals delivered from the peak hold circuits 64 and 66. This difference signal $(V_A - V_B)$ is converted to digital data by means of an AD converter 70, and the digital data are read into the offset detector 76 of the microprocessor 40.

The offset detector 76 uses the proportion coefficient K representing the characteristics shown in FIG. 10 to determine an offset $\beta$ for each of the data heads 2-1 to 2-n and stores these offset amounts $\beta$ into the offset memory 78 using a RAM.

At the time of write or read to or from the data heads 2-1 to 2-n, data are transferred to the data heads 2-1 to 2-n by means of a read/write control circuit 72 and read/write circuit 74. At this time, the head selection circuit 62 is controlled by the microprocessor 40 to provide a write or read by a predetermined data head selected by the circuit 62.

Figure 12:
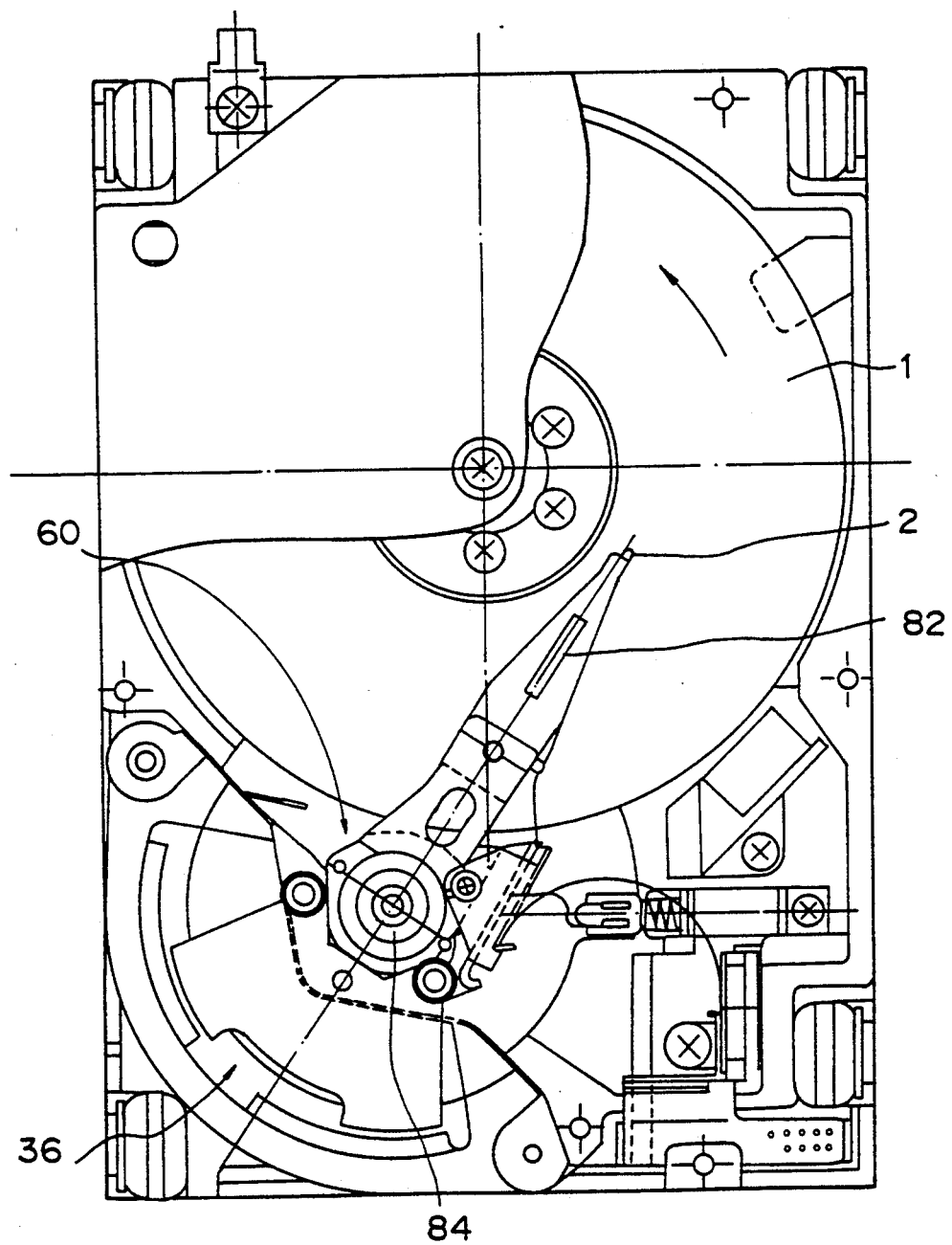
FIG. 12 is a sectional view of a disk enclosure of FIG. 6.
Figure 13:
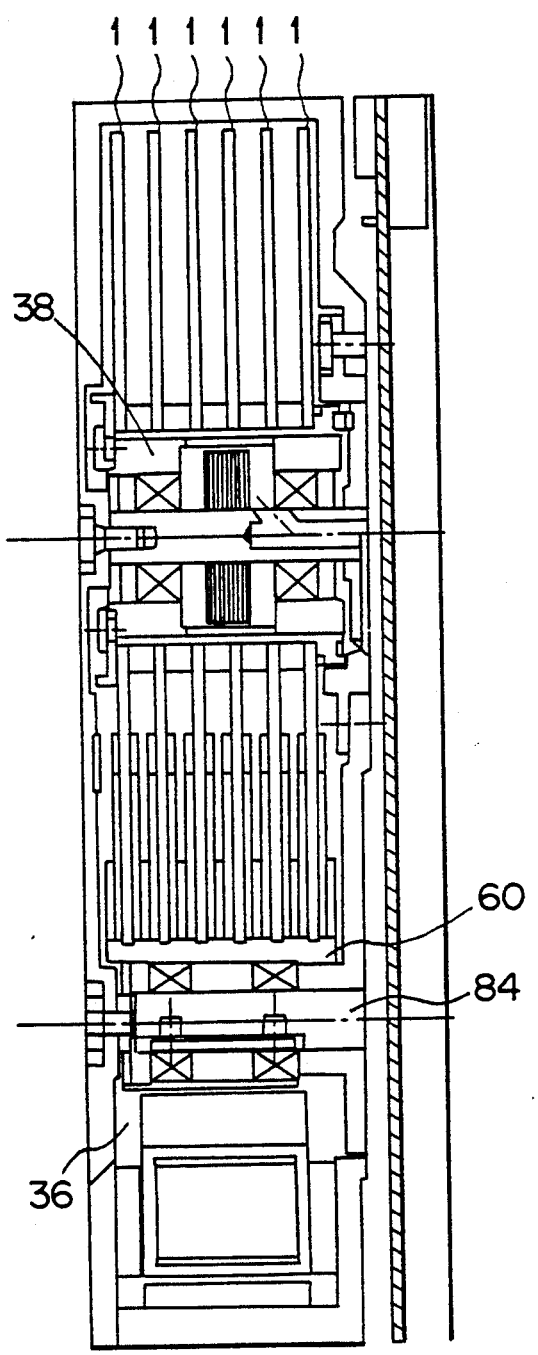
FIG. 13 is a side sectional view of the disk enclosure of FIG. 12.

FIGS. 12 and 13 show the structure of the magnetic disk unit according to the present invention. As seen from FIG. 12, one magnetic disk 1 is provided in the disk enclosure (DE); however, FIG. 13 shows six magnetic disks 1 provided in the disk enclosure.

The head actuator 60 has an arm 82 that is fitted at the free end thereof with a head 2, and the arm 82 is driven about a shaft 84 by VCM 36.

The offset detection by the offset detector 76 of the microprocessor 40 shown in FIG. 6 will be discussed herebelow with reference to the flowchart in FIG. 14.

Figure 14:
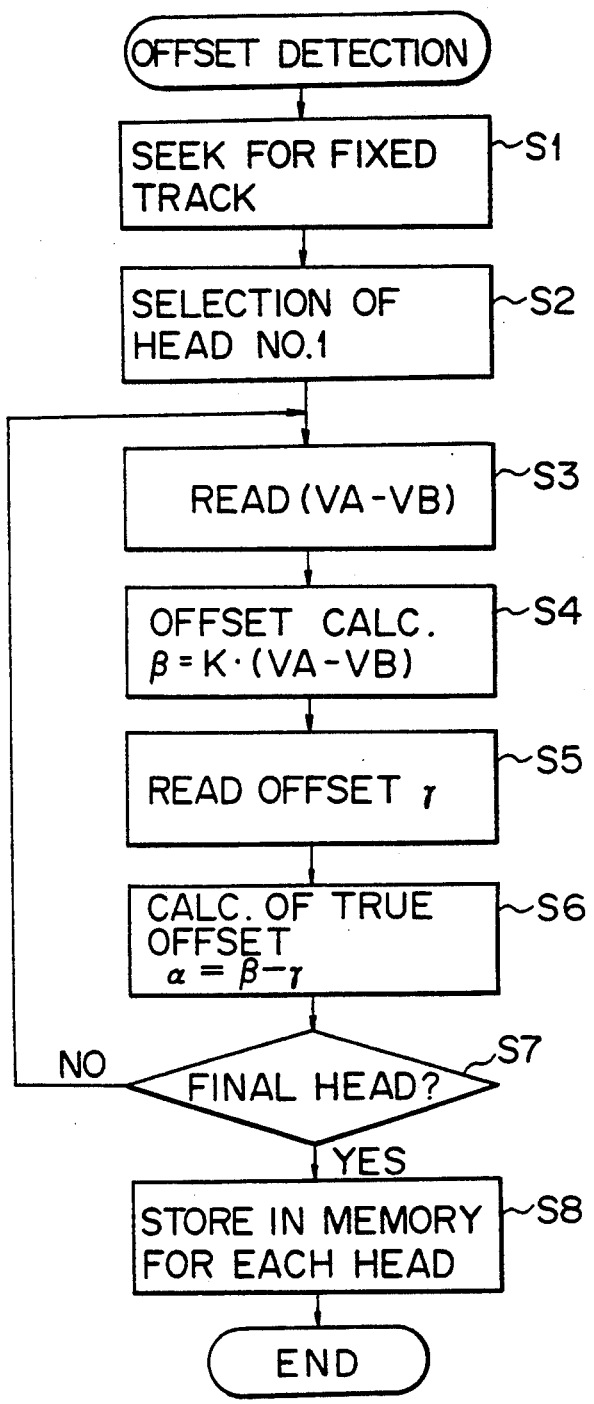
FIG. 14 is a flowchart showing an offset detection process by an offset detector of FIG. 6.

As seen in FIG. 14, the head is first positioned for access to a predetermined track (cylinder) at step S1 and the operation goes to step S2 for ontrack-control based on the servo information on the servo surface. At this step S2, the No. 1 data head 2-1 is selected.

At a next step S3, the difference signal $(V_A - V_B)$ between the read signals $V_A$ and $V_B$ based on the servo information A and B on the data surface is read. At step 4, the difference signal is multiplied by the constant proportion coefficient K to calculate the offset $\beta$ of the No. 1 data head 2-1.

Then, the operation goes to step S5 where the offset $\gamma$ of the servo head 34 is detected based on the position signal available at this time and shown in FIG. 11.

At step S6, the real offset $\alpha$ is determined under the assumption that $\alpha = \beta - \gamma$.

At step S7, it is checked to determine whether the head is the last head or not, and the operations at steps S3 to S6 are repeated down to the last head. If the head is determined at step S7 to be the last head, the operation proceeds to step S8 where the detected offset $\alpha$ is stored into the RAM for each data head.

Figure 15:
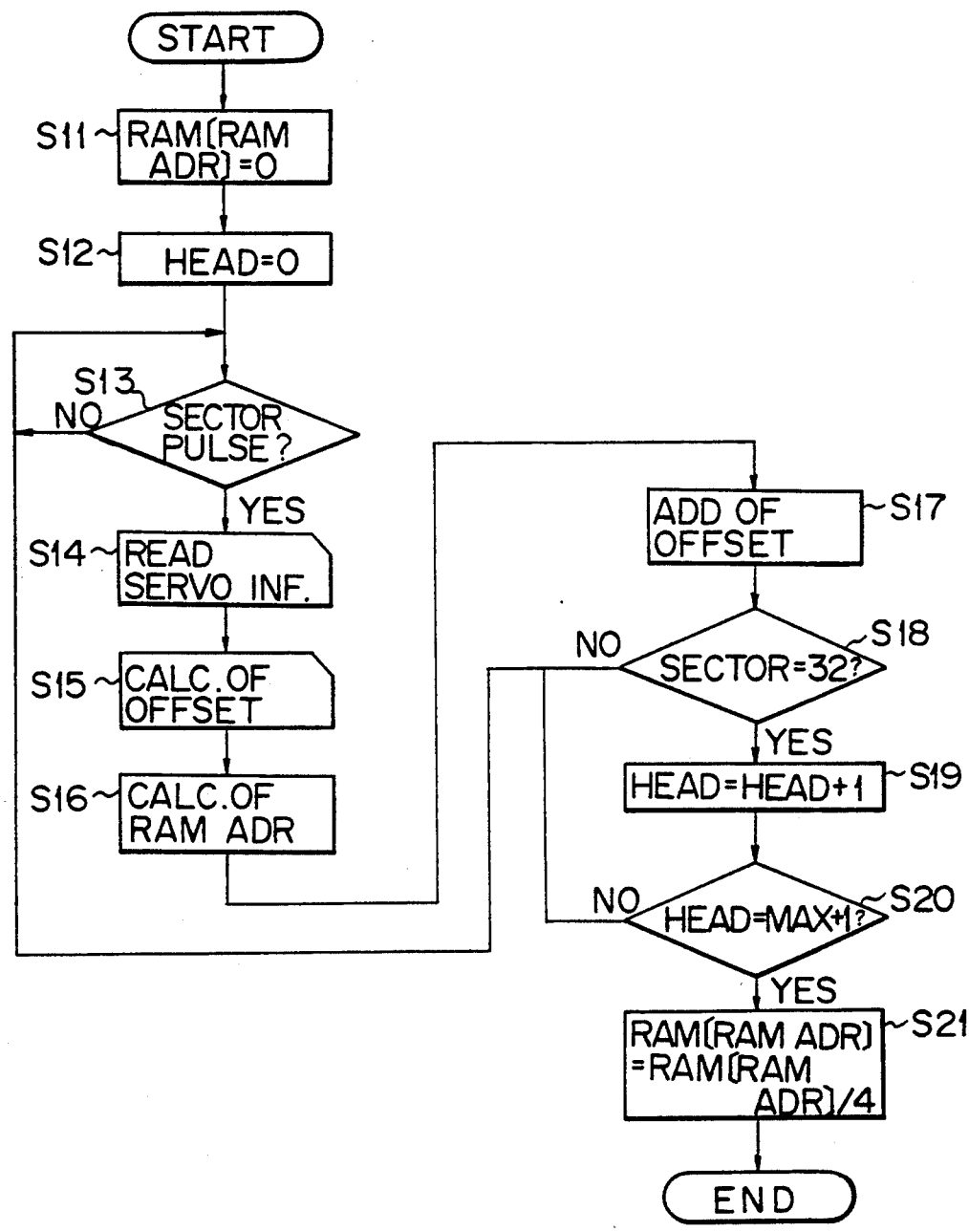
FIG. 15 is a flowchart showing a storage process of an offset detection value for a RAM in the embodiment.

FIG. 15 shows a flowchart showing another embodiment of the storing operations of the offset detector 76 of FIG. 6 for storage into the offset memory 78.

The storage shown in FIG. 15 is characterized in that, for correction of an offset due to the eccentricity of a magnetic disk or the like, offsets for a number of sectors per cylinder, that is, for example, 32 sectors per cylinder, is detected and stored.

Figure 16:
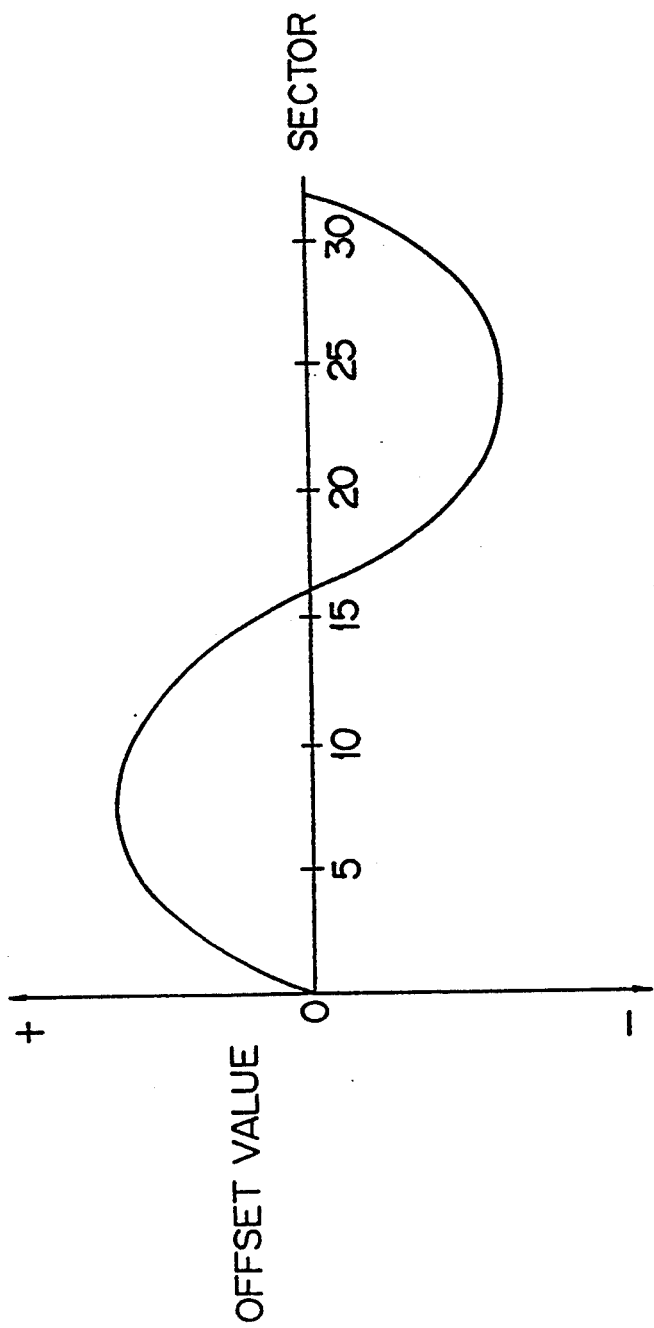
FIG. 16 is an explanatory diagram illustrating the offset value in 32 sectors of one cylinder caused by an eccentric disk.

FIG. 16 shows an example of an offset for 32 sectors detected by operations shown in FIG. 15. In this example, since the offset is due to the eccentricity of a magnetic disk, one full rotation of the magnetic disk corresponds to one cycle of a sine function change.

Figure 17:
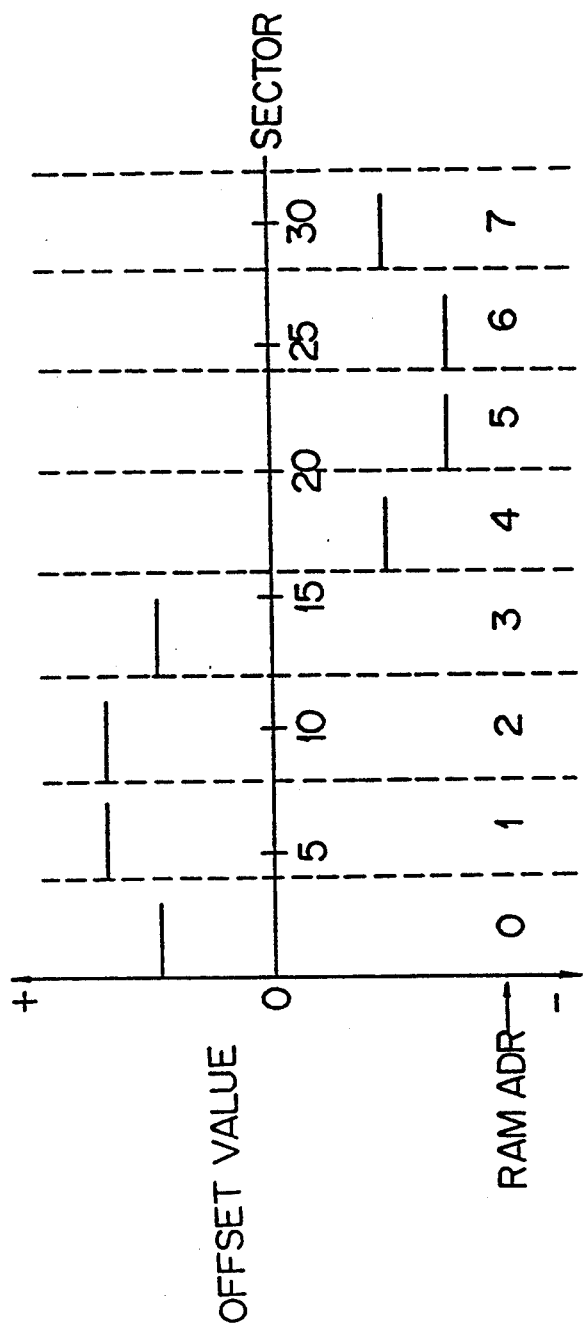
FIG. 17 is an explanatory diagram illustrating stored data in the RAM of FIG. 15.

In the operations for storage according to the present invention, the 32 sectors are divided into N=4 group. A mean offset is calculated for every 4 sectors and stored into RAM as shown in FIG. 17. Thus, the number of RAM addresses per cylinder can be reduced from 32 for raw data to 8 as shown in FIG. 17.

These storing operations will be discussed in further detail herebelow with reference to FIG. 15.

Step S11:
The contents at all addresses in RAM are cleared.

Step S12:
Head number is set HEAD=0.

Step S13:
It is monitored and determined whether there exists a sector pulse or not. When a sector pulse is found, the operation proceeds to step S14.

Step S14:
Servo information on the data and servo surfaces, for the sector are read in.

Step S15:
Operations shown at steps S3 to S6 in FIG. 14 are performed to calculate the offset $\alpha$.

Step S16:
RAM address (RAM ADR) at which the detected offset $\alpha$ is stored is calculated under the assumption that RAM ADR=(SECTOR/4)+HEAD×8+RAM TOP ADDRESS. Thus, all the RAM addresses for every 4 sectors shown in FIG. 17 have the same value.

Step S17:
Offset values belonging to the same RAM address are sequentially added together. Namely, an offset OFFSET[SECTOR] detected at this time is added to a value RAM[RAM ADR] stored at a same RAM address where the previously detected offset was stored.

Step S18:
It is determined whether the last sector (32nd) is reached or not. The operations at steps S13 to S18 are repeatedly done down to the last sector.

Step S19:
HEAD value indicative of a head number is incremented by one to select the next data head.

Step S20:
It is checked to determine whether the operations for the last head are finished or not.

Step S21:
When the operations for the last head are completed, all the values stored in the RAM at that time, that is, a total sum of offsets detected for every 4 sectors, are averaged by dividing by 4 and stored.

Figure 18:
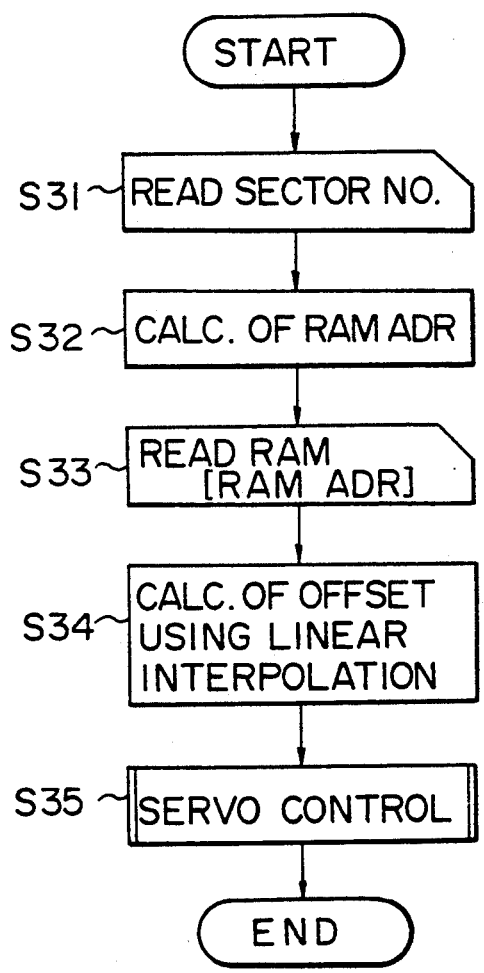
FIG. 18 is a flowchart showing a positioning control including a restoration of the offset value by a linear interpolation of the storing data of the RAM.

FIG. 18 is a flowchart of the operations for the head positioning control, with an offset correction at the time of a read or write using the mean offset obtained through the averaging calculation by the operations in FIG. 15, which are stored in the RAM. This control is featured by the fact that the offset for each sector is restored by linear interpolation using the mean offset.

Step S31:
The number for a to-be-accessed sector is read in.

Step S32:
A storage address in the RAM (RAM ADR) is calculated from the sector number under the assumption that RAM ADR=(SECTOR/4)+HEAD×8+RAM TOP ADDRESS.

Step S33;
Contents RAM[RAM ADR] at the calculated RAM address are read out.

Step S34:
Offset of the to-be-accessed sector is calculated by linear interpolation.

Step S35:
A servo control is effected with an offset correction in which the head is moved to eliminate the offset restored during the seeking of a designated sector in a designated cylinder.

The linear interpolation at step S34 in FIG. 18 will be described in further detail below.

First, the sector number is normalized to a common value every four sectors. This normalized common value is expressed with a remainder derived from the division of the sector numbers 1 to 32 by N=4. Namely, the remainder thus obtained will be a repetition of "0, 1, 2, 3".

The above remainder is defined as MOD(SECTOR, 4).

Figure 19:
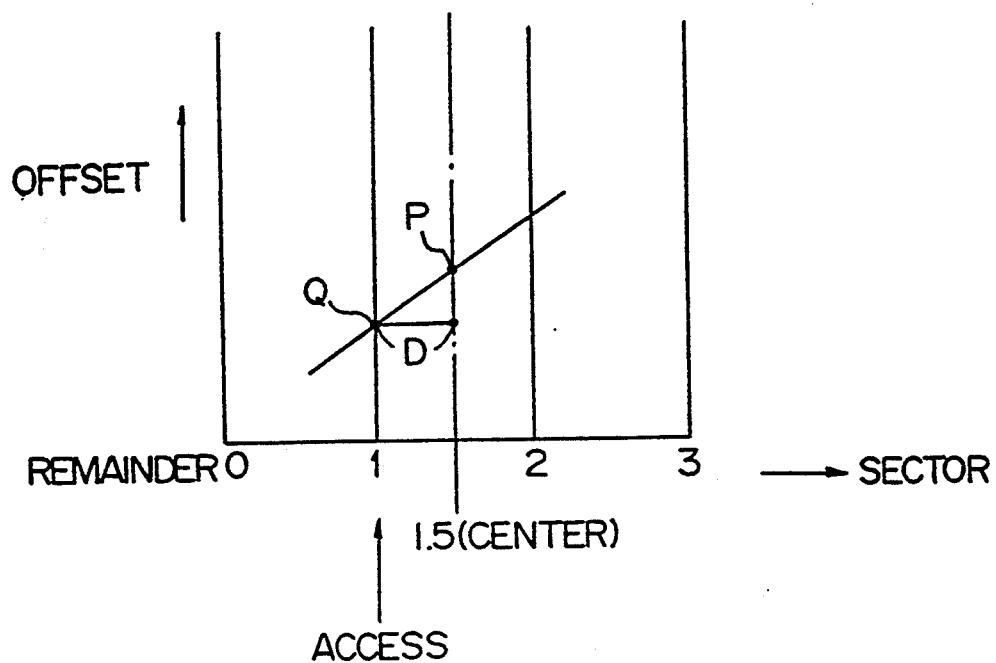
FIG. 19 is an explanatory diagram illustrating the linear interpolation of FIG. 18.

In FIG. 19, the normalized four sectors of which the numbers are normalized to a common value and expressed with the remainders "0, 1, 2, 3" are shown along the horizontal axis.

In the case of the remainders 0, 1, a linear interpolation is effected using a gradient K1 of a straight line obtained from the contents RAM[RAM ADR] at a RAM address in consideration and those RAM[RAM ADR−1] at the preceding RAM address.

The above gradient K1 is calculated as follows:

$$K1 = (RAM[RAM\ ADR] - RAM[RAM\ ADR-1])/4$$

On the other hand, in the case of the remainders 2, 3, a linear interpolation is effected using a gradient K2 of a straight line obtained from the contents RAM[RAM ADR] at a RAM address in consideration and those RAM[RAM ADR+1] at the following RAM address.

This gradient K2 is calculated as follows:

$$K2 = (RAM[RAM\ ADR+1] - RAM[RAM\ ADR])/4$$

As shown in FIG. 19, since the mean value falls on the position of the central remainder 1.5, for example, on the P point, an offtrack value OFFSET[SECTOR] indicated with a linear-interpolated Q point of the to-be-accessed sector can be calculated by determining a difference (D) between the remainder 1.5 at the central position and the remainder, for example 1 being a to-be-accessed sector position to be (MOD(SECTOR, 4)−1.5), multiplying this difference by the gradient K1 (alternately K2 when the remainder of the to-be-accessed sector is 2, 3) and adding the value at the P point to the result of the multiplication.

Namely, in the case of the remainder MOD (SECTOR, 4)=0, 1, the following calculation is done:

```
OFFSET[SECTOR]
  = ((RAM[RAM ADR] − RAM[RAM ADR − 1])/4) *
    (MOD(SECTOR, 4) − 1.5) + RAM[RAM ADR]   ...(1)
Also, in the case of the remainder MOD[SECTOR,
4] = 2, 3,
  OFFSET[SECTOR]
  = ((RAM[RAM ADR + 1] − RAM[RAM ADR])/4) *
    (MOD(SECTOR, 4) − 1.5) + RAM[RAM ADR]   ...(2)
```

FIG. 20 shows an example calculation of an implemented linear interpolation under the assumption that RAM top address=1000, head number HEAD=2 and sector=11. It is also assumed here that a means offset=15 is stored at a RAM address in consideration and that a mean offset=9 is stored at the following address. Since the remainder of the sector 11 is 3, the equation (2) is of course used.

Figure 21:
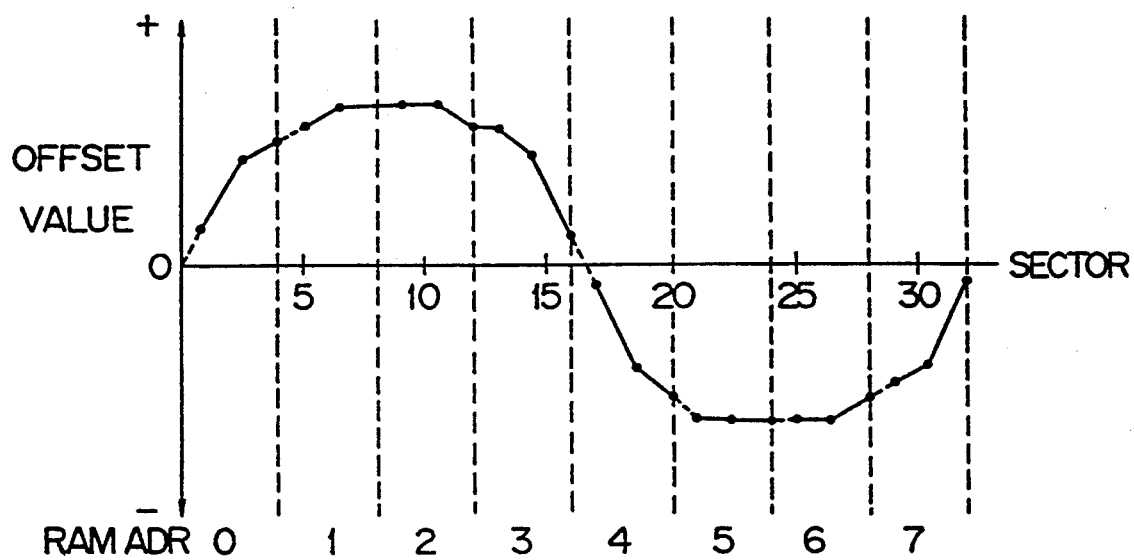
FIG. 21 is an explanatory diagram illustrating the offset values for 32 sectors restored by the linear interpolation.

FIG. 21 shows an offset restored from the contents stored in RAM shown in FIG. 17 by linear interpolation. The raw data shown in FIG. 17 can be sufficiently fitted.

Figure 22:
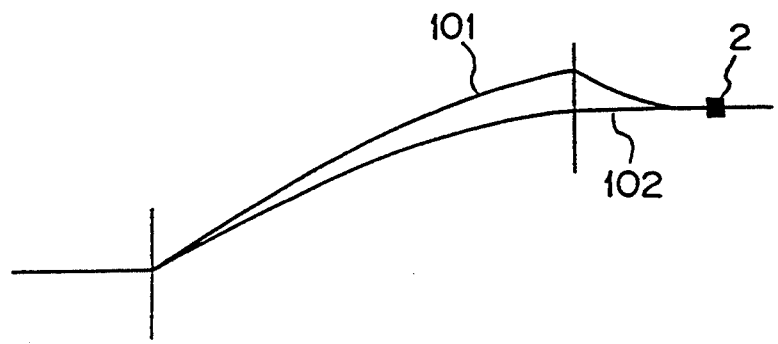
FIG. 22 is an explanatory diagram of the servo control with the offset correction of FIG. 18.

FIG. 22 shows a head positioning servo control with an offtrack correction (offset correction) at step S35 in FIG. 18. As shown at (101), an offset correction may be done during ontrack after completion of a seek. Also as shown at (102), an offset correction may be done at the start of a seek to position the head over an object sector by a seeking operation. By determining the offtrack correction at the start of a seek as shown at (102), it is possible to reduce the time until the head is ontrack.

Note that the numbers of magnetic disks and heads, respectively, in the aforementioned embodiments, are just examples and they may be appropriately determined.

The servo surface is provided on one of the plurality of disks that is located at either the highest or lowest position, but it may also be provided on a disk at an appropriate position such as a middle position.

Further, since the magnetic disk unit of this embodiment has an offset detecting mode executed by the data head offset detecting circuit and a data write or read mode, in which the data head writes or reads data onto or from the data surface of the disk data medium; when the unit is executing the offset detecting mode, the data write or read mode also may interrupt the offset detecting mode.

In the data head offset detecting circuit for use in a magnetic disk unit, having the aforementioned construction according to the present invention, the servo head 34 and data heads 2 are mechanically coupled to each other. Therefore, the vibrations applied to both these data and servo heads are of the same magnitude. By determining an offset of each data head and assuming that the offset ($\alpha$)=(offset ($\beta$) based on the servo information on the data surface—offset ($\gamma$) based on the servo information on the servo surface), it is possible to accurately detect the offset even when the heads are vibrated.

For correction of an offset of the data head due to the eccentricity of the disks and any other cause, it is necessary to detect the offset for each of the sectors per cylinder, and if the offset for each head is to be detected, the capacity of a RAM that stores the offset has to be rather large.

Under the assumption that one cylinder consists of 32 sectors, the RAM capacity can be reduced to $\frac{1}{4}$ (1/N) by storing a mean offset determined for every (N=4) sectors.

By linear interpolation for restoration of an offset for each sector from the mean offset, offset correction can be done with sufficiently high accuracy.

As having been described in the foregoing, the present invention permits the accurate detection of an offset without any error due to vibration even if the offset detection is done while the head is oscillating due to external vibration and considerably improves the accuracy of head positioning control with an offset correction using the servo information on the servo and data surfaces.

We claim:

1. A data head offset detecting circuit in a magnetic disk unit including a servo surface on a disk data medium;
   a servo head provided opposite the servo surface;
   a plurality of data surfaces on disk media that store data;
   a plurality of data heads provided opposite the data surfaces, respectively,
   a data head offset detecting circuit for detecting an offset of the data head using servo information of the servo surface and servo information of the data surfaces, comprising,
   a first offset detecting means, operatively connected to the data head, for detecting an offset value of the data heads based on the servo information read by the data heads from the data surfaces, while positioning the servo head based on the servo information read by the servo head from the servo surface;
   a second offset detecting means for detecting an offset value of the servo head based on the servo information read by the servo head from the servo surface, when the servo information on the data surface is read by the data head;
   an offset calculating means for calculating a true offset value by subtracting the offset value detected by the second offset detecting means from the offset value detected by the first offset detecting means; and
   an offset value storing means, operatively connected to the calculating means, for storing the true offset value calculated by the offset calculating means.

2. A data head offset detecting circuit as set forth in claim 1 wherein the disk data medium and the disk data media include a plurality of tracks divided into a plurality of sectors, the servo head and the data heads having an ontrack position for each track, said circuit further comprising means for recording first servo information offset a constant amount outward from the ontrack position and second servo information offset the constant amount inward from the ontrack position for each sector as servo information on the data surfaces.

3. A data head offset detecting circuit as set forth in claim 2, wherein said first offset detecting means calculates a signal indicative of a difference between the first servo information and the second servo information read by the data heads from the data surface and multiplies the difference by a constant proportion coefficient to detect the offset.

4. A data head offset detecting circuit as set forth in claim 1, further comprising an offset memory using a RAM that stores for each of said data heads the offset value calculated by said offset calculating means.

5. A data head offset detecting circuit as set forth in claim 4, wherein the servo information on said data surfaces are recorded for each sector, and offsets detected for each sector are averaged by a predetermined number of sectors and stored into the offset memory.

6. A data head offset detecting circuit as set forth in claim 5, further comprising a positioning controller for providing an offset correction at the time of a read or write by said data heads from or onto the data surfaces by reading a mean offset value for a to-be-accessed sector and sectors just before and next to said to-be-accessed sector, and determining an offset for said to-be-accessed sector by linear interpolation.

7. A magnetic disk unit using a data head offset detecting circuit including a servo surface on a disk data medium, a servo head provided opposite the servo surface, a plurality of data surfaces on disk media that store data, a plurality of data heads provided opposite the data surfaces, respectively, a data head offset detecting circuit for detecting an offset of the data heads using servo information on the servo surface and servo information on the data surfaces, comprising a first offset detecting means, operatively connected to the data head, for detecting an offset value of the data heads based on the servo information read by the data heads from the data surfaces, while positioning the servo head based on the servo information read by the servo head from the servo surface;

a second offset detecting means, operatively connected to the servo head, for detecting an offset value of the servo head based on the servo information read by the servo head from the servo surface, when the servo information on the data surface is read by the data head;

an offset calculating means, operatively connected to the first and second offset detecting means, for calculating a true offset value by subtracting the offset value detected by the second offset detecting means from the offset value detected by the first offset detecting means, and an offset value storing means, operatively connected to the calculating means, for storing the true offset value calculated by the offset calculating means.

8. A magnetic disk unit as set forth in claim 7, wherein said unit has an offset detecting mode executed by the data head offset detecting circuit and a data write or read mode, in which the data head writes or reads data onto or from the data surface of the disk data medium, is executed, and when the unit has executed the offset detecting mode, the data write or read mode interrupts the offset detecting mode.

* * * * *

UNITED STATES PATENT AND TRADEMARK OFFICE
CERTIFICATE OF CORRECTION

PATENT NO. : 5,321,564
DATED : June 14, 1994
INVENTOR(S) : Takahashi et al.

It is certified that error appears in the above-indentified patent and that said Letters Patent is hereby corrected as shown below:

On the title page: Item [21]

After "Appl. No.:", delete "875,989" and insert --875,080--.

Column 1, line 29, delete "was" and insert --is--.

Column 10, line 33, after "ADR" second occurance delete "[)" and insert --])--.

Signed and Sealed this

Fourth Day of April, 1995

Attest:

BRUCE LEHMAN

Attesting Officer    Commissioner of Patents and Trademarks